P. GERVASONI AND A. ZECCHINI.
APPARATUS FOR INDICATING THE LEVEL OF LIQUIDS AT DISTANCE.
APPLICATION FILED JUNE 14, 1919.
1,347,944. Patented July 27, 1920.
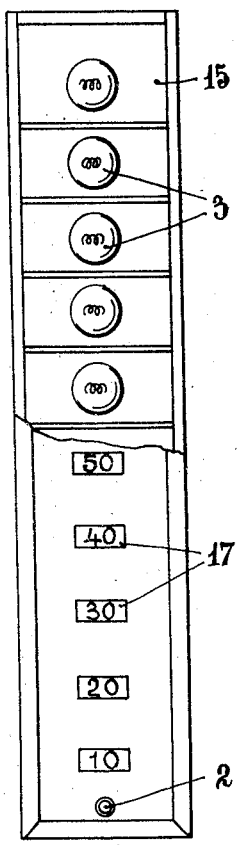
Fig.4
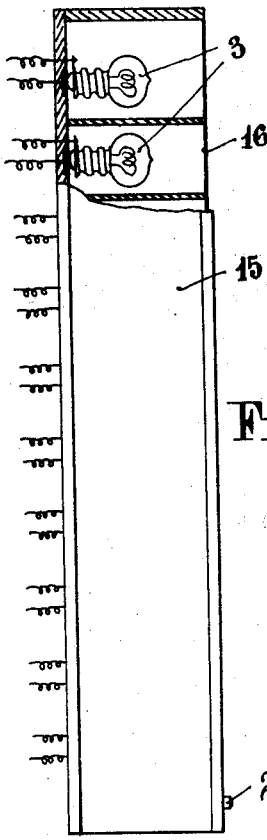
Fig.5
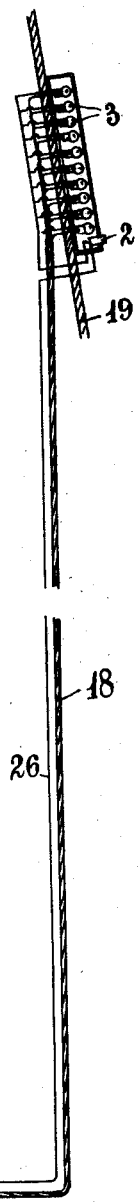
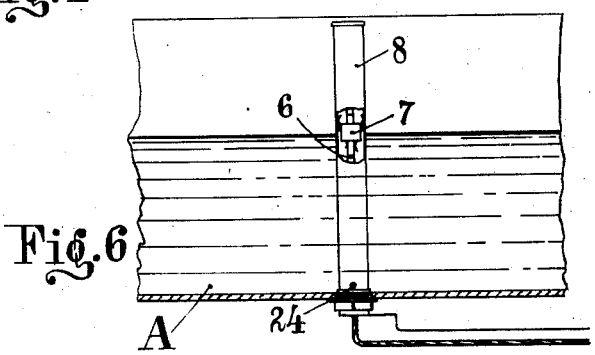
Fig.6
INVENTORS.
Alfredo Zecchino & Pietro Gervasoni
By Laurence Langner
Attorney.

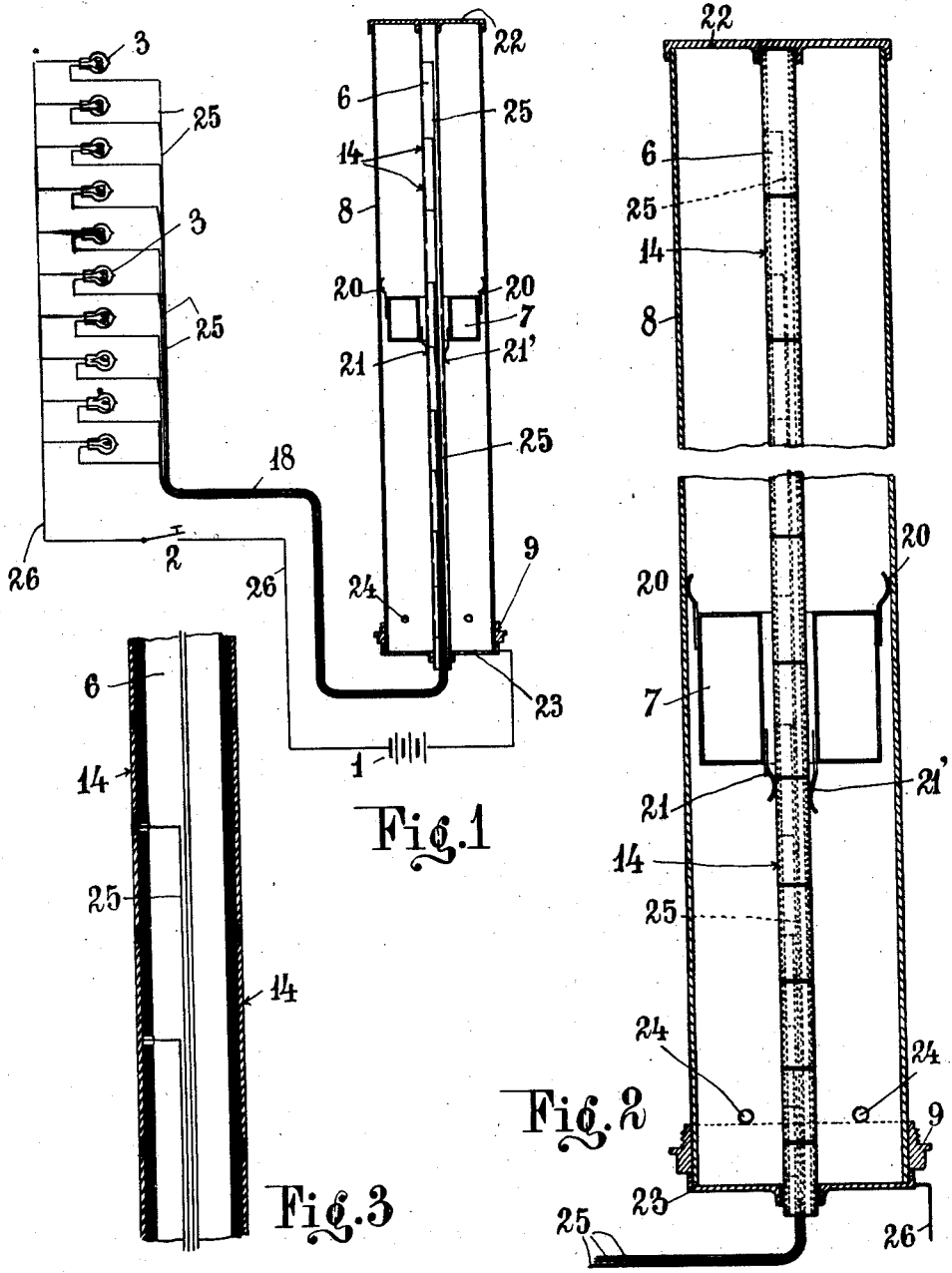

UNITED STATES PATENT OFFICE.

PIETRO GERVASONI AND ALFREDO ZECCHINI, OF TURIN, ITALY, ASSIGNORS TO GIUSEPPE RATTI, OF TURIN, ITALY.

APPARATUS FOR INDICATING THE LEVEL OF LIQUIDS AT DISTANCE.

1,347,944.          Specification of Letters Patent.      Patented July 27, 1920.

Application filed June 14, 1919. Serial No. 304,258.

*To all whom it may concern:*

Be it known that we, PIETRO GERVASONI and ALFREDO ZECCHINI, subjects of the King of Italy, and residents of Turin, Italy, have invented certain new and useful Improvements in Apparatus for Indicating the Level of Liquids at Distance, of which the following is a specification.

This invention relates to means for giving at distance an indication of the level of a liquid contained in a tank and has for its object an apparatus comprising a float adapted to be moved by said liquid and acting to control a number of electric circuits each of which comprises an indicator which is operated by the passage of electric current therethrough to give an indication as to level of said liquid.

A preferred embodiment of this invention comprises as indicators a number of electric lamps having one of their terminals connected with a common pole of the electric current source, this common connection being controlled by a switch which is operated when it is desired to read said indication.

On the annexed drawing Figure 1 is a diagrammatic view of an embodiment of this invention, Fig. 2 is the central section of the member intended to be located in the tank, Fig. 3 is the central section on an enlarged scale of the rod carrying electric contacts controlled by the float; Fig. 4 is a front view partly in section of the casing containing indicating lamps; Fig. 5 is the side view of the same; Fig. 6 shows the application of the apparatus to a tank.

As shown on the drawing, the apparatus comprises a hollow cylinder 8 intended to be located in the tank A (Fig. 6) and provided with heads 22 and 23. The cylinder 8 is provided with holes 24 for allowing the liquid to enter said cylinder and issue therefrom so that the liquid level in it corresponds at any time with the level in tank A. The cylinder 8 is also provided with proper means for connecting it with the tank walls, say a screw threaded collar 9.

Within cylinder 8 and secured to heads 22 and 23 is mounted an insulating tube 6 having on its outer surface a number of conducting sleeves 14 which are insulated from each other and from cylinder 8. An annular float 7 is provided within said cylinder this float encircling said tube 6 and having springs or brushes 20 contacting with the wall of cylinder 8 as well as brushes or springs 21 21' contacting with sleeves 14.

Each of these sleeves 14 is connected by means of an individual wire 25, inclosed within tube 6, with one terminal of a lamp 3 the other terminals of these lamps being connected by a common wire 26 with a switch 2 which in turn is connected with one pole of a source 1 of current the other pole of which is connected with cylinder 8.

As it is obvious, by operating switch 2 the circuit of the source 1 is closed through cylinder 8, brushes 20, float 7, brushes 21—21', sleeve 14 contacting therewith, corresponding wire 25 and lamp 3, and wire 26, and therefore one lamp is lighted which corresponds with particular sleeve 14 contacted by brushes 21—21' of float 7 and therefore with level of liquid into tank A and cylinder 8, the position of float 7 and the particular sleeve 14 bridged thereby with cylinder 8 depending upon the level of said liquid.

By this arrangement the circuit of source 1 is permanently open, the same being closed only when switch 2 is operated that is when an indication of the level is required, this increasing the life of said source which conveniently consists of a cell or cells.

It is convenient that sleeves 14 near the bottom of cylinder 8 are made shorter than that located near the top thereof, a larger number of them being located at said bottom, for the purpose of giving more exact indications when the liquid in tank A is near to be exhausted.

Further float 7 must be provided at least with two brushes as 21—21' the same having different lengths as shown, in order to insure the indicating circuit to be closed also when one of said brushes contacts with the insulating section of pipe 6 intermediate adjacent sleeves 14, the other one contacting at this time with one of said sleeves 14 owing to its different length.

The indicating board consists of a casing 15 in which lamps 3 are arranged in a single or a plurality of rows, said casing having an opening for each lamp 3 in front of which may be located a translucent screen 16 having proper indications 17 written thereon (Figs. 4 and 5).

Said board must be located within sight of the operator and switch 2 is conveniently mounted therein, as shown in said figures.

The apparatus according to this invention may be applied in any case in which it is desired to have at distance an indication of the level of a liquid contained in a tank, and it provides a simple mounting being only necessary to arrange a cable 18 consisting of said individual wires 25 insulated from each other and connecting the apparatus with the board; further the inspection or reading is made easy as the figures or other writings indicating the level are lightened and may have as large a size as desired.

Fig. 6 shows by way of example the application of this apparatus to the fuel tank A of an aeroplane or the like, the cylinder 8 being mounted therein and being connected by cable 18 with the board 15 located on the dash 19 near the pilot seat.

The apparatus according to this invention insures a safe operation as the only moving part is the float 7 which is not liable to be put out of operation.

Obviously it is to be understood that the apparatus according to this invention may be used in any circumstances the use thereof being not limited to said case described as an example.

What we claim as our invention and desire to secure by United States Letters Patent is:

1. A float-operated circuit controlling device for electric level indicators comprising a tubular body communicating with the tank containing the liquid the level of which is to be indicated and having an inner surface of material conductive of electricity; a bar mounted in said tubular body and carrying a plurality of separate sleeves said sleeves being conductive of electricity and being insulated from each other; and a float in said tubular body encircling said bar, said float having contact with said tubular body and with the separate sleeves carried by said bar to electrically bridge the inner surface of the tubular body and the separate sleeves carried by said bar.

2. A float-operated circuit controlling device for electric level indicators comprising a tubular body communicating with the tank containing the liquid the level of which is to be indicated and having an inner surface of material conductive of electricity; a bar mounted in said tubular body and carrying a plurality of separate sleeves said sleeves being conductive of electricity and being insulated from each other; a float in said tubular body encircling said bar and having contact with the inner surface of the tubular body; and contact members carried by said float and adapted to engage the sleeves of the bar, the contact surface of said contact members being in different horizontal planes, the vertical distance between said contact surfaces being greater than the distance between the surfaces of the adjacent sleeves whereby one of said contact surfaces is always in contact with a sleeve on said bar.

3. A float-operated circuit controlling device for electric level indicators comprising a tubular body communicating with the tank containing the liquid, the level of which is to be indicated, and having an inner surface of material conductive of electricity; a bar mounted in said tubular body; a plurality of separate sleeves said sleeves being adapted to conduct electricity and being insulated from each other, the sleeves at the lower part of the bar being shorter than those at the upper part of the bar; and a float mounted in said tubular body and encircling the bar and sleeves thereon and having contact with the tubular body and the sleeves on the bar to electrically bridge the inner surface of the tubular body and the sleeves on said bar.

4. A float-operated circuit controlling device for electric level indicating devices comprising a tubular member communicating with the tank containing the liquid, the level of which is to be indicated, and having an inner surface conductive of electricity; a bar located in said tubular member formed of insulating material and being hollow to form a conduit for wires of the circuits to be controlled by the device; a plurality of metallic sleeves electrically separated from each other carried by said bar and connected to the wires passing through said bar; a float located in said tubular member and loosely encircling said bar and the sleeves thereon; and contact devices on the float engaging the inner surface of the tubular member and the sleeves on the bar to electrically bridge said tubular member and the sleeves carried by the bar.

In testimony whereof we have signed our names to this specification in the presence of two subscribing witnesses.

PIETRO GERVASONI.
ALFREDO ZECCHINI.

Witnesses:
  CARLO CORTA,
  GIUSEPPE DITRI.